Oct. 25, 1955    J. W. PALM    2,721,638
ONE-WAY CLUTCH
Filed Jan. 8, 1953
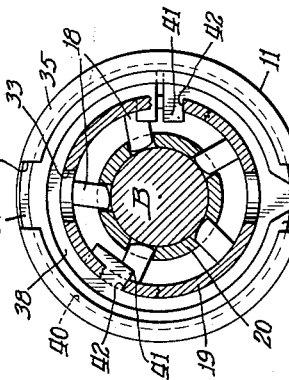
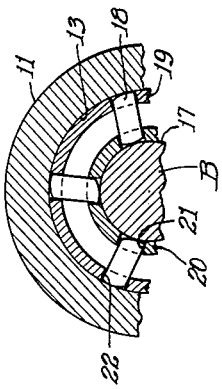
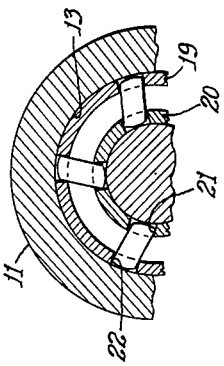
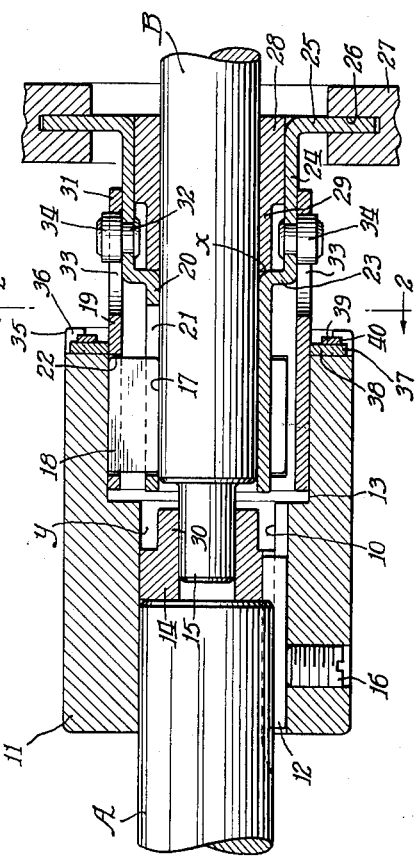
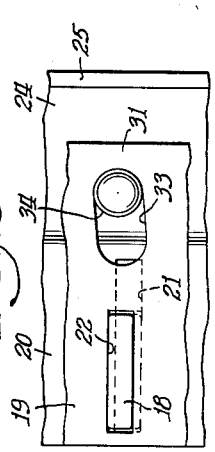
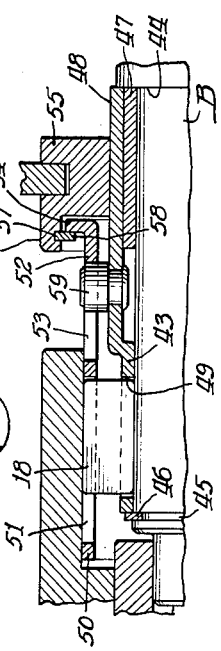
Inventor:
James W. Palm
By: E. K. Landy
Atty

United States Patent Office 2,721,638
Patented Oct. 25, 1955

2,721,638

ONE-WAY CLUTCH

James W. Palm, Rockford, Ill., assignor to Borg-Warner Corporation, Chicago, Ill., a corporation of Illinois Application January 8, 1953, Serial No. 330,201

17 Claims. (Cl. 192—47)

The present invention relates to a one-way clutch assembly wherein provision is made for readily releasing the clutching members or grippers thereby to release the clutch.

It is one of the principal objects of this invention to simplify the construction of a one-way clutch assembly such as contemplated herein, and to improve the efficiency and operation of such assembly.

An object of the present improvements is to provide a one-way clutch assembly which utilizes a sprag connection between the drive and driven members, and wherein said sprag members are controllable by means of a shiftable release bearing for selectively effecting the engagement or disengagement of the clutch. This function may be performed either manually or by automatically operated mechanical means.

Another object is to provide a one-way clutch of the sprag type wherein one of the cage members which space the sprags is slidable axially of the assembly thereby to effect a bodily movement of the sprags into positions wherein they are inoperative to wedge against the races.

Another object is to provide a one-way clutch assembly of the character above defined wherein a take-off or driven shaft is piloted on or within the outer race member, said driven shaft having a cylindrical outer surface which defines the inner race member. An arrangement of this character eliminates a separate race member and thus effects a reduction of the parts required in a one-way clutch assembly.

A still further object hereof resides in providing means whereby one of the sprag retaining cages between the race members is shiftable in an axial direction with respect to the assembly and during such axial movement this cage is also independently rotated with the result that all of the sprags are moved to positions in non-gripping relation to the race members and thereby positively prevent engagement of the one-way clutch.

Additional objects, aims and advantages of the improvements contemplated herein will be apparent to persons skilled in the art after the construction and operation of the present one-way clutch assembly is understood from the within description. It is preferred to accomplish the numerous objects of this invention and to practice the herein defined improvements in substantially the manner hereinafter fully described and as more particularly pointed out in the appended claims, reference being made to the accompanying drawings that form part of this specification.

In the drawings:

Fig. 1 is a longitudinal axial section of a typical installation of the present improvements in a one-way clutch assembly of the sprag type;

Fig. 2 is a transverse section of the clutch assembly shown in Fig. 1 and taken along the plane of line 2—2 thereon;

Fig. 3 is a sectional view similar to Fig. 2, showing the sprags in positions for gripping the race members of the clutch;

Fig. 4 is a view similar to Fig. 3 and disclosing the relative positions assumed by the sprags when the clutch assembly has been disengaged;

Fig. 5 is a fragmentary view looking at the top of the structure shown in Fig. 1; and, Fig. 6 is a fragmentary axial section similar to Fig. 1 and disclosing an alternative or modified arrangement of the release mechanism for a one-way clutch.

The drawings are to be understood as being generally of a diagrammatic character merely for the purpose of disclosing typical or preferred embodiments of the improvements contemplated herein, and in these drawings like reference characters identify the same parts in the different views.

Referring first to Figs. 1 and 6 of the drawings, it will be seen that the disclosed clutch assembly is operatively mounted between a driving shaft A connected to an engine crank shaft or other prime mover, and an output or driven shaft B in axial alignment with said driving shaft. The end region of the driving shaft A is entered in the bore 10 of a cylindrical block 11 to which it is secured through the medium of a keyway arrangement 12 that is locked in position by means of the radial bolt 16 threaded through a lateral aperture in the block as shown in Fig. 1. The bore 10 is enlarged at one end to define the outer race 13 of the one-way clutch, and said bore 10 has therein a pilot bearing 14 in which the adjacent reduced end region 15 of the output shaft B is supported and journaled. The smooth cylindrical region of output shaft B within the block 11 and rearward of the reduced end 15, defines the inner race member 17 of the clutch assembly, thus eliminating the necessity of providing a structurally independent or separate race member and thereby effects a reduction of the number of parts usually comprised in a one-way clutch assembly.

A plurality of grippers, preferably in the form of tiltable sprags 18 having rectangular contour are interposed between these outer and inner race members 13 and 17 respectively in the manner shown in Fig. 2. These sprags may be of the usual construction and have their radially outer and inner work faces properly formed to wedge against the surfaces of the corresponding race members 13 and 17 for transmitting torque between the drive and driven shafts A and B, as will be readily understood. When changes of torque occur, these sprags become dislodged from their gripping positions and one shaft may rotate independent of the other shaft in an overrunning manner. Differently stated, the sprags or grippers may tilt to one angle to the axis of the clutch to wedge their work edges against the races for drivingly connecting the race members and shafts, and may tilt to another angle to the axis for disengaging the sprags from the races so that the shafts may rotate independently of each other, or one shaft may cease rotation.

The sprags 18 are maintained in spaced relation to each other between the races 13 and 17 by outer and inner cages 19 and 20, which lie adjacent the respective race surfaces. The work edges of said sprags protrude beyond said cage members to be gripped against said races in a manner well known in the art. As seen in Figs. 1 and 6, the inner and outer cages comprise cylindrical metal members each having therein a plurality of peripherally spaced openings which are axially elongated to receive and position the radially inner and outer regions of the sprags 18.

For the purpose of carrying out the present improvements, the openings 21 in the inner cage member 20 are longer in an axial direction than the sprag openings 22 in the outer cage member 19, as shown in Fig. 1. This arrangement permits longitudinal bodily movement of the inner cage member 20 independently of the outer cage member 19. For performing a similar function by means of the structure shown in Fig. 6, the openings 51 in the outer cage member 50 have longer axial dimensions than the openings 49 in the inner cage member 43 to permit axial shift of the outer cage. As hereinafter explained, the movement of one cage with respect to the other is effective to move the sprags to positions for engagement with the inner and outer races and upon reverse shift of the actuating cage the sprags are released. Thus it is not necessary to provide a garter spring or other instrumentality for effecting instantaneous locking action of the sprags in the manner of the usual sprag clutch.

Referring particularly to the arrangement shown in Fig. 1, the internal surface of the inner cage member 20 rests on the inner race 17 which is defined by an adjacent surface region of the driven shaft B and said cage member 20, beyond its elongate openings 21, is formed with an outwardly flared radial shoulder 23 terminating in an axial extension 24 of a larger diameter than the body portion 20. The end of the extension 25 remote to shoulder 23 has a radial flange 25 projecting outwardly for engagement in a groove 26 in the transverse edge of a shift collar 27 that is movable in axial directions. A bushing 28 is interposed between the cage extension 24 and shaft B for providing a bearing for said extension. It will be noted that this bushing 28 has a reduced end region 29 the transverse end edge of which defines an abutment or stop $x$ for coaction with the shoulder 23. The bearing 14 which pilots the adjacent end of shaft B is reduced as at 30 adjacent end of the inner cage member 20 to provide an annular recess $y$ between said reduced portion and the surface of bore 10 in the cylindrical block 11. By reason of this arrangement, when the cage member 20 is shifted axially in the manner hereinafter described, the end portion of the inner cage member 20 will be accommodated in this annular recess.

It will also be seen that the outer cage member 19 has an extension portion 31 which projects outside the bore or outer race 13 in block 11 and rests on the extension 24 of the inner race member. The inner cage extension 24 carries a plurality of radial studs 32 which are fixed thereon and project outward into elongate longitudinal slots 33 in the outer cage extension 31. These studs 32 carry anti-friction rollers 34 which are adapted to travel in and are guided by the side walls of the slots 33 in the outer cage extension 31. As clearly shown in Fig. 5 the slots 33 are arranged at an angle which is oblique to the axis of the assembly to define a cam arrangement. When the shift collar 27 is moved in an axial direction the oblique slots 33 are adapted to impart a rotary movement to one of the cages and thereby bodily move the sprags into positions where they cannot become grippingly engaged with the races. In the structure above described in respect to Fig. 1, the outer cage member 19 is held against axial movement, and the camming action exerted by the rollers 34 operating in the oblique slots 33 is effective to rotate the inner cage member 20 and thus function to tilt the sprags 18 to positions where the clutch is disengaged.

For effectively retaining or locking the outer cage member 19 against independent rotative movement, particularly with respect to the race block 11 and the inner cage member 20, the end of said block is formed with an axially extending annular rim portion 35 having radial notches or recesses 36 therein to receive oppositely arranged radial ears 37 at the outer periphery of a split retainer washer 38 to hold the latter against movement. A snap ring 39 is inserted into an annular internal groove 40 in the rim portion 35 to lock the retainer washer in place. As seen in Fig. 2, the retainer washer also has lugs 41 projecting inwardly from its inner periphery to be received in notches or slots 42 in the adjacent regions of outer cage member 19. This arrangement is effective to lock the outer cage member 19 against movement with the inner cage member 20 when the latter is rotatably shifted in an axial spiral path in response to the camming action between the rollers 34 and slots 33.

In the assembly disclosed in Fig. 6 the relative movement between the cages is reversed. It will be seen that the inner cage member 43 is fixed against longitudinal axial movement in one direction by providing a shoulder 44 on the shaft B to define a stop for the adjacent end of said cage member, and the piloted end of said shaft has an annular channel 45 to receive a snap ring 46 which engages the adjacent end of said cage member 43 to prevent longitudinal movement in the opposite direction. A bushing 47 surrounds shaft B and has its outer surface contacting the inner surface of the widened extension 48 of the inner cage member 43. Also it is to be noted that the sprag slots or apertures 49 in this inner cage are all of a length sufficient to accommodate the longitudinal dimension of a sprag. The outer cage member 50 in this assembly is the particular element which is adapted to be shifted longitudinally for performing the clutch release function. For efficiently accomplishing this function, the sprag-receiving slots 51 in said cage member 50 are elongated in an axial direction to accommodate the sliding movement by said cage, and the extension portion 52 of said cage, having therein the cam slot 53, terminates in a radial outwardly extending flange 54. The shift collar 55 has an outwardly projecting annular rim 56 which overlies the cage flange 54, and said rim is provided with an internal groove 57 to receive a snap ring 58 which retains the cage flange 54 in cooperative association with the shift collar 55. Thus it is apparent that when the collar is shifted axially in the direction of the arrow said collar will move the outer cage 50 to the right and the camming action generated by the oblique slots 53 and rollers 59 will be effective to rotate the outer cage member in a direction to tilt the sprags to positions for releasing the clutch and also maintain the sprags in nongripping relation with respect to the inner and outer races.

From the foregoing it is apparent that the present improvements comprising a one-way sprag type clutch assembly wherein one of the cages which space the sprags is slidable in an axial direction and simultaneously therewith said cage has a rotative movement imparted to it through the medium of the cam members cooperatively associated with said inner and outer cage members. This camming action is exerted by positive mechanical means and dispenses with the use of springs or other yieldable, resilient members which are usually employed. Also the improvements contemplate that longitudinal movement of one cage with respect to the other cage will either engage or disengage the clutch.

While this invention has been described in detail in its present preferred forms or embodiments, it will be apparent to persons skilled in the art, after understanding the construction, operation and functions of said improvements, that various changes and modifications may be made therein without departing from the spirit or scope thereof. It is aimed in the appended claims to cover all such changes and modifications.

What is claimed is:

1. A one-way clutch assembly comprising a rotatable outer race member; a rotatable inner race member within and concentric to said outer member; grippers operable to drivingly wedge against said race members; inner and outer cylindrical cages having apertures therein receiving the respective inner and outer regions of said grippers; means constantly restraining said outer cage against movement independently of said outer race member; means operable to effect axial movement of said inner cage; and cam means operative during said axial movement of the inner cage to impart rotative movement thereto for bodily moving said grippers into positions wherein they are inoperative to wedge against the respective race members regardless of the direction of rotation of said race members.

2. A one-way clutch assembly as defined in claim 1, wherein the inner race member comprises a shaft journaled at its end in a pilot bearing within the outer race member; and the inner cage is defined by a cylindrical sleeve movable both axially and circumferentially on said shaft.

3. A one-way clutch assembly as defined in claim 1, wherein the cages are defined by axially elongate cylinders, both of which have portions which protrude longitudinally beyond an end face of the outer race member; and the cam means are located in said protruding portions of the cage cylinders.

4. The one-way clutch assembly of claim 3 in which the cam means comprise a radially projecting member on the protruding portion of the inner cage cylinder and engaged in an oblique slot in the adjacent protruding portion of the outer cage cylinder.

5. A one-way clutch assembly comprising a rotatable outer race member; a rotatable shaft piloted on said outer race member and having a cylindrical surface defining an inner race member concentric with said outer race member; grippers tiltable in directions to drivingly wedge against said both race members; inner and outer cylindrical cages each having apertures therein receiving the respective inner and outer regions of said grippers; means holding said outer cage against movement independent of said outer race member, said inner cage being slidable axially of the clutch assembly, and the apertures in said inner cage being longer axially than the proximate inner regions of said grippers to accommodate said axial sliding movement of the inner cage; and cam means arranged in cooperative association with said cages, and being effective upon said sliding movement of the inner cage to impart rotative movement to said inner cage and thereby bodily move and retain said grippers out of driving engagement with at least one of said race members.

6. A one-way clutch assembly comprising a rotatable outer race member; an inner race member concentric with said outer race member; grippers tiltable in directions to drivingly wedge against said both race members; inner and outer cylindrical cages each having apertures therein receiving said grippers; means holding said outer cage against movement independent of said outer race member; said inner cage being slidable axially of said clutch assembly, and the apertures in said inner cage having proper dimensions to accommodate said axial sliding movement of the inner cage; and cam means operative during said sliding movement of the inner cage to impart rotative movement to said inner cage, whereby said grippers are bodily moved and held in non-driving relation to said race members.

7. A one-way clutch assembly comprising concentric inner and outer rotatable race members; grippers between said race members and tiltable to wedge against said members; concentric radially spaced cages having gripper-receiving apertures therein; means fixing a first of said cages to the adjacent race member; the second of said cages being axially shiftable independent of the first cage, and the apertures in said shiftable second cage being longer in an axial direction than the corresponding dimensions of said grippers thereby to accommodate the axial shift of said second cage; and locking cam means acting on said inner and outer cages and effective upon axial shift of said second cage to bodily move and lock said grippers in non-wedging positions with respect to at least one of said race members.

8. A one-way clutch assembly comprising concentric inner and outer rotatable race members; grippers between said race members and tiltable to wedge against said members; concentric radially spaced cages having gripper-receiving apertures therein; yieldable annular means normally acting on said grippers to urge them into wedging engagement with said race members; means fixing a first of said cages to the adjacent race member; the second of said cages being axially shiftable independent of the first cage, and the apertures in said shiftable second cage being longer in an axial direction than the corresponding dimensions of said grippers thereby to accommodate the axial shift of said second cage; and locking cam means acting on said cages and effective upon axial shift of said second cage to bodily move and lock said grippers in non-wedging positions in opposition to the urge of said yieldable means.

9. A one-way clutch assembly comprising concentric inner and outer rotatable race members; grippers between said race members and tiltable to wedge against said members; concentric inner and outer cages having gripper-receiving apertures; attaching means connecting the outer cage to the outer race member for conjoint rotation; said inner cage being axially shiftable independent of said outer cage and said inner race member, and the apertures in said inner cage being longer in an axial direction than the corresponding dimensions of said grippers thereby to accommodate the axial shift of said iner cage; and a radial member on said inner race member engaged in a cam slot in said outer cage for imparting rotative movement to the inner cage during the aforesaid axially shiftable movement of said inner cage thereby to bodily move and lock said grippers in non-wedging positions with respect to said race members.

10. A one-way clutch assembly comprising concentric inner and outer rotatable race members; grippers between said race members for wedging engagement therewith; an axially shiftable inner cage and a fixed outer cage each having gripper-receiving apertures therein; the apertures in said inner cage being axially longer than the corresponding dimensions of said grippers for accommodating said axial shift of the inner cage; and a radial member on one of said cages engaged in a cam slot in the other cage for imparting rotative and axial movement to the inner cage during the aforesaid shifting movement thereof thereby to bodily move said grippers to non-wedging positions.

11. A one-way clutch assembly comprising inner and outer rotatable race members; apertured inner and outer cages each having axially extending apertures therein; axially elongate grippers between said race members for wedging engagement therewith; said race members and cages being concentrically arranged, said inner cage being axially shiftable and having longer apertures than the axial length of said grippers; a radial member on one cage engaged in an axially extending cam slot in the other cage for imparting rotative axial movement to said shiftable cage during the aforesaid axially shiftable movement the latter cage thereby to bodily move said grippers to non-wedging positions.

12. A one-way clutch assembly comprising concentric inner and outer race members rotatable on a common axis; a rotatable shaft having a circumferential region defining one of said race members; tiltable axially elongate grippers having generally rectangular cross-section to define flat side faces and being radially positioned between said race members for wedging engagement of their inner and outer edges with said race members; concentric first and second cages each having axially extending gripper-receiving apertures therein respectively engaging radially inner and outer regions of said grippers; one of said cages being mounted on said shaft for axially shiftable movement thereon independent of the other cage and having apertures longer than the axial length of said grippers for accommodating the axial movement of said shiftable cage; a radial member on one of said cages operably engaged in an axially oblique slot in the other cage for imparting combined rotative and axial movement to said shiftable cage during the aforesaid axially shiftable movement thereof to bodily move and lock said grippers in non-wedging positions; and means restraining the non-shiftable cage against axial movement.

13. A one-way clutch assembly comprising concentric inner and outer rotatable race members; a rotatable shaft having a circumferential region defining one of said race members; flat-faced sprags radially arranged between said race members for wedging engagement of their radially inner and outer edges therewith and tiltably operable to wedge against said members; concentric first and second cages each having sprag-receiving apertures therein; attaching means connecting said first cage to the adjacent race member for conjoint rotation therewith; one of said cages being mounted on said shaft and axially shiftable thereon independent of the other cage and having its apertures longer in an axial direction than the corresponding dimensions of said sprags for accommodating the axial shift of said one cage; and a radial member on one of said cages and operable against axially oblique means on the other cage for imparting rotative movement to said one cage during the aforesaid axially shiftable movement of said other cage thereby to bodily move and lock said sprags in non-wedging positions with respect to said race members.

14. A one-way clutch assembly comprising a rotatable outer race member, and a rotatable shaft piloted therein having a circumferential region within said outer member defining a rotatable inner race member; tiltable grippers arranged between said race members for wedging engagement therewith; a cylindrical outer cage fixed to said outer race member and having an elongate end region beyond said outer race member; a cylindrical inner cage mounted for sliding movement on said shaft and having an elongate end region beyond said outer race member with a radially enlarged portion adjacent said extended region of said outer cage; said cages having axially elongate apertures for guiding said grippers, the apertures in said inner cage being longer axially than the outer cage apertures to accommodate said sliding movement of said inner cage; and cam means arranged in cooperative association with the said elongate end regions of said cages and operative during axial sliding movement of said inner cage to impart rotative movement to said inner cage thereby to bodily move said grippers into non-wedging positions with respect to said race members.

15. A one-way clutch assembly comprising a rotatable outer race member, and a rotatable shaft piloted therein having a circumferential region within said outer member defining a rotatable inner race member; tiltable grippers arranged between said race members for wedging engagement therewith; a cylindrical outer cage fixed to said outer race member; a cylindrical inner cage mounted for sliding movement on said shaft; said cages each having axially extending apertures embracing said grippers, and the inner cage apertures being axially longer than the outer cage apertures to accommodate said sliding movement of said inner cage; extensions on said cages protruding beyond said outer race member; a portion of one extension having a different diameter than the apertured region of the corresponding cage to define telescoped regions of said cages, and cam means arranged in cooperative association with said telescoped regions of the cages and operative during axial sliding movement of said inner cage to impart rotative movement to said inner cage thereby to bodily move said grippers into non-wedging positions with respect to said race members.

16. A one-way clutch assembly comprising concentric inner and outer race members; flat-faced sprags arranged in generally radial positions and operable to wedge their radially inner and outer edges against said race members; concentric inner and outer cages each having elongate apertures therein receiving said sprags; one of said cages being axially shiftable with respect to the clutch assembly, and the outer cage being fixed with respect to said one cage; and cam means cooperatively associated with said cages and effective upon the aforesaid axial shift of said one cage to rotate said one cage and thereby bodily tilt said sprays to non-wedging positions with respect to said race members.

17. A one-way clutch assembly comprising concentric inner and outer race members; rectangular sprags having flat faces and arranged in generally radial positions, said sprags being operable to wedge their inner and outer edges against said race members; concentric inner and outer cages each having elongate apertures therein receiving said sprags; one of said cages being movable in both rotatable and axial directions with respect to the clutch assembly, and the other cage being fixed with respect to said one cage; and cam means on said cages and operable upon axial movement of said movable cage to effect rotation thereof and thereby bodily turn said sprags on their longitudinal axes into non-wedging positions with respect to said race members.

References Cited in the file of this patent

UNITED STATES PATENTS

| | | |
|---|---|---|
| 463,703 | Murdock | Nov. 24, 1891 |
| 838,024 | Hendricks | Dec. 11, 1906 |
| 1,256,755 | White | Feb. 19, 1918 |